April 7, 1959  D. R. CRAIG ET AL  2,880,662
PHOTOGRAPHIC METHOD AND APPARATUS
Filed Nov. 19, 1954
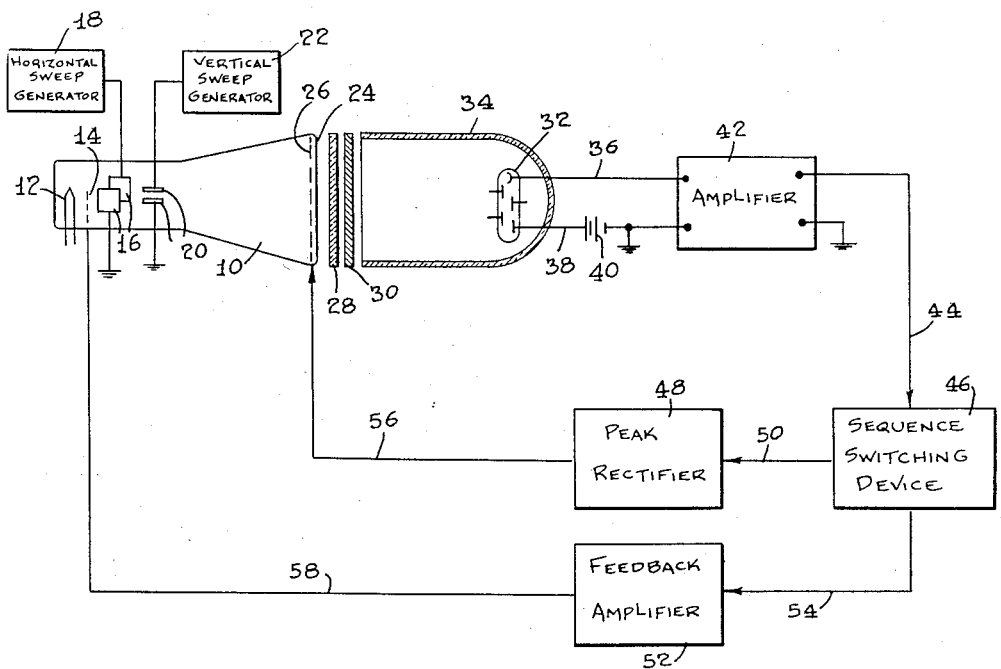
INVENTORS
DWIN R. CRAIG AND
JOHN N. STREET
BY Raymond Wootton
ATTORNEY

United States Patent Office 2,880,662
Patented Apr. 7, 1959

2,880,662

PHOTOGRAPHIC METHOD AND APPARATUS

Dwin R. Craig, Falls Church, Va., and John N. Street, Washington, D.C., assignors, by mesne assignments, to Log Etronics, Inc., Alexandria, Va., a corporation of Delaware Application November 19, 1954, Serial No. 470,113

10 Claims. (Cl. 95—73)

This invention relates to a photographic method and apparatus by which contrast selection is completely automatic and exceedingly rapid.

The selection of print contrast in accordance with known photographic procedures has involved the use of different types of paper having varying density-exposure characteristics, the contrast of a particular paper being known as its gamma, expressed in terms of the slope of the density-exposure $(D - \log E)$ curve.

At the present time, there is at least one type of paper whose gamma value is a function of the color of the impinging light, which paper is known as "Varigam" and manufactured by E. I. du Pont de Nemours & Company, Wilmington, Delaware. Inasmuch as the "Varigam" paper gives a high contrast print with blue light and a low contrast one with red light and because the contrast of the final print is the product of the negative contrast and the paper characteristic, a particular color of light must be chosen for each negative in order to produce prints possessing uniform contrast characteristics. This has been accomplished by the interposition of color filters between a light source and the negative, requiring preliminary measurement or approximation of the negative contrast together with physical movement of a filter to interpose it between the light source and transparency. Since negative contrast is readily confused with the average density of a negative, it is exceedingly difficult to arrive at an accurate determination of the contrast. Selection and interposition of filters, manualy or mechanically is tedious and time consuming.

The problems and difficulties of these known procedures have been overcome in accordance with the present invention by the use of a scanning light beam to illuminate the negative or other transparency and by having the color of the beam readily variable in an automatic manner. In a preferred form of the invention the beam color is varied electronically so that the selection of contrast can be exceedingly rapid.

It is contemplated that a standard cathode ray television tube may serve as a light source in combination with a photocell producing a feed-back to the tube. After the contrast of the negative has been sensed and the color of the beam established, the output of the photocell supplies a negative feed-back to a control element of the cathode tube to maintain the average exposure of all portions of the photosensitive surface on which the print is to be formed, substantially constant.

It is important that the contrast measuring period for determination of the beam color be relatively short as compared with the total exposure time. It is also important that the spectral sensitivity of the photocell be chosen, by means of filters or otherwise, to match the spectral response of the emulsion defining the photosensitive surface and the spectral transmission characteristics of the paper or other support for the emulsion.

In accordance with the present invention there is provided a photographic method comprising energizing a light source to produce a variable light beam, directing the beam to illuminate a portion of the subject with a spot of finite area, scanning the subject with the spot and directing light from each portion of the subject to a light intensity sensing device, and modifying the color of the beam as a function of the intensity sensed. A photosensitive surface is preferably disposed between the subject and the sensing device to receive a real image, and light directed from the photosensitive surface is directed on the sensing device. The color of the beam is adjusted or modified before the photosensitive surface has been appreciably exposed whereupon the color adjusted beam is modified as a function of the sensed intensity to maintain the average exposure of all portions of the photosensitive surface substantially constant. The light directed to the sensing device may be transmitted through the photosensitive surface. Similarly, the light impinging on the photosensitive surface may be directed through the subject. Thus, the intensity of the beam may be modified as a function of the sensed intensity. The light source is preferably a cathode ray tube and the subject is preferably scanned in two dimensions along paths having substantially linear components whose ratio of repetition rates is other than an integer.

From the standpoint of apparatus, the present invention comprises a cathode ray tube having a cathode, control electrodes and a screen, a light intensity sensing device in the optical path of light emanating from the tube, a light transmitting subject disposed in the path between the screen and sensing device, adjusting means for the color of the beam associated with the tube, and a circuit including the sensing device, the color adjusting means and translating means for modifying the color of light impinging on the subject as a function of the intensity of light transmitted by the subject to the sensing means. A photosensitive surface is also disposed in the optical path between the subject and sensing device. The sensing means has an output circuit including a sequence switching device sequentially energizing the adjusting means for a brief period just sufficient to select a beam color and then one of the control electrodes of the cathode ray tube for a longer period to obtain a substantially constant average exposure of all portions of the photosensitive surface. The adjusting means may be a color grid disposed within the tube adjacent the screen and the translating means may assume the form of a peak rectifier for adjusting the color of the beam as a function of the contrast characteristics of the subject.

A more complete understanding of the invention will follow a description of the accompanying drawing, the single figure of which depicts the apparatus diagrammatically.

A color cathode ray tube 10 is provided with a cathode 12, a control grid 14, deflection plates 16 connected in circuit with a horizontal sweep generator 18, and deflection plates 20 connected in circuit with a vertical sweep generator 22. The electron beam produced by the tube produces light on a fluorescent color screen 24 provided at the end of the tube, under the control of a color grid 26 such as that employed in the well known "Lawrence" type of color tube. Light produced on the fluorescent screen 24 is directed through a photographic transparency 28 and a photosensitized surface 30 on which the ultimate print will be formed. Beyond the photosensitized surface 30 in the optical path of the light produced by the tube, a photomultiplier tube 32 is provided within a light collector 34 to sense the intensity of light transmitted from the sensitized surface. The output of the photomultiplier tube 32 is connected by a pair of leads 36 and 38 containing a source of current 40 to the input of an amplifier 42 whose output is connected by a conductor 44 to the input of a sequence switching device 46.

The output of the sequence switching device 46 is alternately supplied to a peak rectifier 48 by means of a lead 50 or to a feed-back amplifier 52 by a lead 54. The output of the peak rectifier is connected by means of a lead 56 to determine the voltage applied to the color grid 26 and thereby adjust the color of the light beam produced by the tube. The output of the feed-back amplifier 52 is applied to the control grid 14 by means of a conductor 58 to produce a negative feed-back effect by which the intensity of light sensed by the photomultiplier tube will tend to remain constant. Similarly, the output of the amplifier 52 is applicable to modify the scanning speed as a function of the light intensity sensed by the photomultiplier tube.

In operation, the sequence switching device 46 initially connects the output of the amplifier 42 to the peak rectifier 48 in order to adjust the color of the beam as a function of the contrast present in the negative or other transparency 28 as represented by the ratio of maximum to minimum voltage peaks produced by the photomultiplier tube. Such signals will be peak rectified and stored as a D.C. voltage which, applied to the color grid 26 establishes the color of the light emitted by the cathode tube. After a sufficient integrating time of scanning has elapsed to establish this color control voltage, the sequence switching device connects the output of the amplifier 42 to the feed-back amplifier 52. The time during which the peak rectifier is energized is relatively brief so that the photosensitized surface 30 is not appreciably exposed to light until after the color of the beam has been established. From this point on, the output of the photomultiplier tube 30 will be utilized in precisely the manner described in application Serial No. 453,747, filed September 2, 1954, now Patent No. 2,842,025, to control the intensity of the cathode beam as a function of the intensity sensed by the photomultiplier tube and thereby maintain the average exposure of all portions of the photosensitive surface substantially constant.

The invention is readily applicable to color tubes of other types and should not be limited to the specific tube type or circuit illustrated herein beyond the scope of the appended claims.

We claim:

1. A photographic method comprising producing a polychromatic variable beam of light, directing said beam to illuminate an elemental area of a subject, scanning said subject with said beam and directing a portion of said light from each elemental area of said subject to form a real image on a photosensitive surface whose value of gamma is a function of the color of incident light, directing a portion of said light from each elemental area of said subject to a light intensity sensing device, adjusting the color of said light beam as a function of a variation in intensity sensed by said device, and thereafter scanning said subject while maintaining said adjusted color constant for all elemental areas of said subject, and continuously modifying the product of intensity and exposure time of said light beam as a function of the sensed intensity to produce substantially constant average exposure of all elemental areas of the photosensitive surface.

2. A photographic method as set forth in claim 1 wherein said subject is a black and white transparency.

3. A photographic method as set forth in claim 1 wherein said function is the peak to peak value of said intensity variation.

4. A photographic method as set forth in claim 1 wherein the light directed to the sensing device is transmitted through said photosensitive surface.

5. A photographic method as set forth in claim 1 wherein light is directed through the subject to the photosensitive surface.

6. A photographic method as set forth in claim 1 wherein the intensity of the beam is modified as a function of the sensed intensity.

7. Photographic apparatus comprising a cathode ray tube having a cathode, control electrodes and a screen, a light intensity sensing device in the optical path of polychromatic light emanating from said tube, a light transmitting subject disposed in said path between said screen and sensing device, a photosensitive surface in the path of light emanating from said tube, adjusting means for the color of said beam associated with said tube, and a circuit including said sensing device, said color adjusting means and translating means for modifying and maintaining constant the color of light impinging on said subject as a function of the intensity variations of light transmitted by said subject to said sensing means, and a second circuit including said sensing device, one of said control electrodes and a negative feedback amplifier for maintaining the average exposure of all portions of said photosensitive surface substantially constant.

8. Photographic apparatus as set forth in claim 7 wherein said adjusting means is a color grid disposed within said tube adjacent said screen.

9. Photographic apparatus as set forth in claim 7 wherein said translating means is a peak rectifier for adjusting the color of said beam as a function of the contrast characteristics of said subject.

10. Photographic apparatus comprising a cathode ray tube having a cathode, control electrodes and a screen for producing a polychromatic light beam, a light intensity sensing device in the optical path of polychromatic light emanating from said tube, a light transmitting subject and a photosensitive surface serially disposed in said path between said screen and sensing device, adjusting means for the color of said beam associated with said tube, said sensing means having an output circuit including a sequence switching device sequentially energizing first said adjusting means to select and maintain constant a beam color and then one of said control electrodes to maintain the average exposure of all elemental areas of the photosensitive surface substantially constant.

References Cited in the file of this patent

UNITED STATES PATENTS

| 1,742,943 | Tuttle et al. | Jan. 7, 1930 |
| 2,101,932 | Eggert et al. | Dec. 14, 1937 |
| 2,462,340 | Simon | Feb. 22, 1949 |
| 2,484,299 | Labrum | Oct. 11, 1949 |
| 2,499,039 | Simmon | Feb. 28, 1950 |
| 2,565,399 | Simmon | Aug. 21, 1951 |
| 2,691,917 | Curry | Oct. 19, 1954 |
| 2,757,571 | Loughren | Aug. 7, 1956 |
| 2,764,060 | Horak | Sept. 25, 1956 |

FOREIGN PATENTS

| 713,285 | Great Britain | Aug. 11, 1954 |